United States Patent
Zhang et al.

(10) Patent No.: US 9,316,503 B2
(45) Date of Patent: Apr. 19, 2016

(54) METHOD, SERVER, AND SYSTEM FOR OBTAINING NAVIGATION INFORMATION

(71) Applicant: TENCENT TECHNOLOGY (SHENZHEN) COMPANY LIMITED, Shenzhen (CN)

(72) Inventors: Yuexin Zhang, Shenzhen (CN); Liqun Zhu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 14/244,114

(22) Filed: Apr. 3, 2014

(65) Prior Publication Data

US 2014/0324344 A1    Oct. 30, 2014

Related U.S. Application Data

(63) Continuation of application No. PCT/CN2013/076427, filed on May 29, 2013.

(30) Foreign Application Priority Data

Apr. 28, 2013   (CN) .......................... 2013 1 0156439

(51) Int. Cl.
   *G01C 21/34*   (2006.01)
   *G01C 21/20*   (2006.01)
(52) U.S. Cl.
   CPC .................................. *G01C 21/206* (2013.01)
(58) Field of Classification Search
   CPC ...... G01C 21/206; G01C 21/00; G01C 21/20; G01C 21/26; G06Q 50/00
   USPC .................................. 701/537, 538, 540, 541
   See application file for complete search history.

(56) References Cited

U.S. PATENT DOCUMENTS 6,343,317 B1 * 1/2002 Glorikian ............ H04L 61/2084
                                                        455/456.3
7,130,742 B2 * 10/2006 Kobuya .................. G01C 21/20
                                                        340/988

(Continued)

FOREIGN PATENT DOCUMENTS

CN          1358019 A        7/2002
CN          1980406 A        6/2007

(Continued)

OTHER PUBLICATIONS

Taiwan Intellectual Property Office (TIPO) Office Action 1 for 102143552 Mar. 26, 2015.

(Continued)

*Primary Examiner* — Jaime Figueroa
(74) *Attorney, Agent, or Firm* — Anova Law Group, PLLC

(57) ABSTRACT

Various embodiments provide methods, servers, and systems for obtaining navigation information. In an exemplary method, a first obtaining request of a client device can be received and the first obtaining request can at least contain navigation key information and a public account ID. According to the public account ID, a target public account database can be determined. The target public account database can be a public account database corresponding to the public account ID. The target public account database can include the navigation key information and corresponding navigation information. According to the navigation key information, navigation information corresponding to the navigation key information from the target public account database can be obtained. The obtained navigation information can then be sent to the client device to display the obtained navigation information.

20 Claims, 7 Drawing Sheets

(56) References Cited

U.S. PATENT DOCUMENTS

| | | | |
|---|---|---|---|
| 8,788,622 B2* | 7/2014 | Sinha | G06F 17/30867 709/201 |
| 2002/0183072 A1* | 12/2002 | Steinbach | G06F 17/3087 455/456.1 |
| 2003/0224776 A1* | 12/2003 | Meng | G06Q 30/02 455/422.1 |
| 2004/0070602 A1* | 4/2004 | Kobuya | G01C 21/36 715/738 |
| 2004/0078813 A1* | 4/2004 | Kobuya | G01C 21/20 725/46 |
| 2006/0188230 A1* | 8/2006 | An | G06F 17/30241 386/227 |
| 2007/0208749 A1* | 9/2007 | Price | G06F 17/30041 |
| 2008/0113614 A1* | 5/2008 | Rosenblatt | G06Q 30/06 455/3.05 |
| 2008/0129528 A1* | 6/2008 | Guthrie | G09B 29/008 340/686.1 |
| 2011/0313653 A1 | 12/2011 | Lindner | |
| 2013/0110633 A1* | 5/2013 | Waldman | G01C 21/20 705/14.58 |
| 2014/0046808 A1* | 2/2014 | Yishaayahu | G06Q 50/01 705/27.1 |
| 2014/0372469 A1* | 12/2014 | Antognini | G06F 17/30864 707/769 |
| 2015/0032838 A1* | 1/2015 | Demsey | H04L 67/2842 709/213 |

FOREIGN PATENT DOCUMENTS

| | | |
|---|---|---|
| CN | 102118708 A | 7/2011 |
| TW | M364904 U1 | 9/2009 |
| TW | M382539 U1 | 6/2010 |
| TW | M383175 U1 | 6/2010 |
| TW | 201221909 A1 | 6/2012 |
| TW | 201305956 A1 | 2/2013 |

OTHER PUBLICATIONS

The World Intellectual Property Organization (WIPO) International Search Report for PCT/CN2013/076427 Jan. 30, 2014.

* cited by examiner

METHOD, SERVER, AND SYSTEM FOR OBTAINING NAVIGATION INFORMATION

CROSS-REFERENCES TO RELATED APPLICATIONS

This application is a continuation of PCT Patent Application No. PCT/CN2013/076427, filed on May 29, 2013, which claims priority to Chinese Patent Application No. CN201310156439.9, filed on Apr. 28, 2013, the entire content of all of which are incorporated herein by reference.

FIELD OF THE DISCLOSURE

The present disclosure relates to the field of network technology and, more particularly, relates to methods, servers, and systems for obtaining navigation information.

BACKGROUND

As people demand more on their spiritual life, museums or tourist attractions have become popular for their leisure time and vacation time. When visiting a museum or tourist attraction, people often need navigating interpretation. Specific navigation devices may be used for visitors in most museums and tourist attractions. As visitors enter the museum and the tourist attraction, they may need to rent such navigation devices and quickly learn how to operate these navigation devices so that they can obtain navigation information corresponding to the museum or the tourist attraction.

Current navigation devices do not have uniform standards and may be operated differently. Each time the visitors need to learn how to use them in a short time, which adds complication for obtaining the navigation information on the site. In addition, each navigation device is an independent electronic device to store and update navigation information. The cost for operation and maintenance on navigation information and electronic device is high.

BRIEF SUMMARY OF THE DISCLOSURE

According to various embodiments, there is provided a method for obtaining navigation information. A first obtaining request of a client device can be received by a backend server and the first obtaining request can at least contain navigation key information and a public account ID. According to the public account ID, a target public account database can be determined by the backend server. The target public account database can be a public account database corresponding to the public account ID. The target public account database can include the navigation key information and corresponding navigation information. According to the navigation key information, navigation information corresponding to the navigation key information from the target public account database can be obtained by the backend server. The obtained navigation information can then be sent to the client device to display the obtained navigation information.

According to various embodiments, there is also provided a method for obtaining navigation information by receiving a first obtaining request of a client device. The first obtaining request can at least contain navigation key information and a public account ID. According to the public account ID, a server of a target public account database can be determined by a backend server. The target public account database can be a public account database corresponding to the public account ID and the target public account database can include the navigation key information and corresponding navigation information. According to the navigation key information, a second obtaining request can be sent to the server of the target public account database by the backend server. The second obtaining request can at least contain navigation key information, such that the server of the target public account database returns navigation information corresponding to the navigation key information. The navigation information corresponding to the navigation key information can be received by the backend server and sent to the client device.

According to various embodiments, there is further provided a method for obtaining navigation information by first receiving a second obtaining request sent from a backend server. The second obtaining request can at least contain navigation key information. According to the navigation key information, the navigation information corresponding to the navigation key information can be obtained by a public account server from pre-stored navigation key information and corresponding navigation information. The obtained navigation information corresponding to the navigation key information can be sent to the backend server by the public account server.

According to various embodiments, there is further provided a backend server. The backend server can include a receiving module, a target database determining module, a navigation information obtaining module, and a sending module. The receiving module can be configured to receive a first obtaining request of a client device. The first obtaining request can at least contain navigation key information and a public account ID. The target database determining module can be configured, according to the public account ID, to determine a target public account database that includes a public account database corresponding to the public account ID. The target public account database can include the navigation key information and corresponding navigation information. The navigation information obtaining module can be configured, according to the navigation key information, to obtain navigation information corresponding to the navigation key information from the target public account database. The sending module can be configured to send the obtained navigation information to the client device to display the obtained navigation information.

According to various embodiments, there is further provided a backend server. The backend server can include a receiving module, a target server determining module, and a sending module. The receiving module can be configured to receive a first obtaining request of a client device, the first obtaining request at least containing navigation key information and a public account ID. The target server determining module can be configured, according to the public account ID, to determine a server of a target public account database. The target public account database can be a public account database corresponding to the public account ID, and the target public account database can include the navigation key information and corresponding navigation information. The sending module can be configured, according to the navigation key information, to send a second obtaining request to the server of the target public account database. The second obtaining request can at least contain the navigation key information, such that the server of the target public account database returns navigation information corresponding to the navigation key information. The receiving module can be configured to further receive the navigation information corresponding to the navigation key information and to send the navigation information corresponding to the navigation key information to the client device.

According to various embodiments, there is further provided a public account server. The public account server can include a receiving module, a navigation information obtaining module, and a sending module. The receiving module can be configured to receive a second obtaining request sent from a backend server, the second obtaining request at least containing navigation key information. The navigation information obtaining module can be configured, according to the navigation key information, to obtain navigation information corresponding to the navigation key information from pre-stored navigation key information and corresponding navigation information. The sending module can be configured to send the obtained navigation information corresponding to the navigation key information to the backend server.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
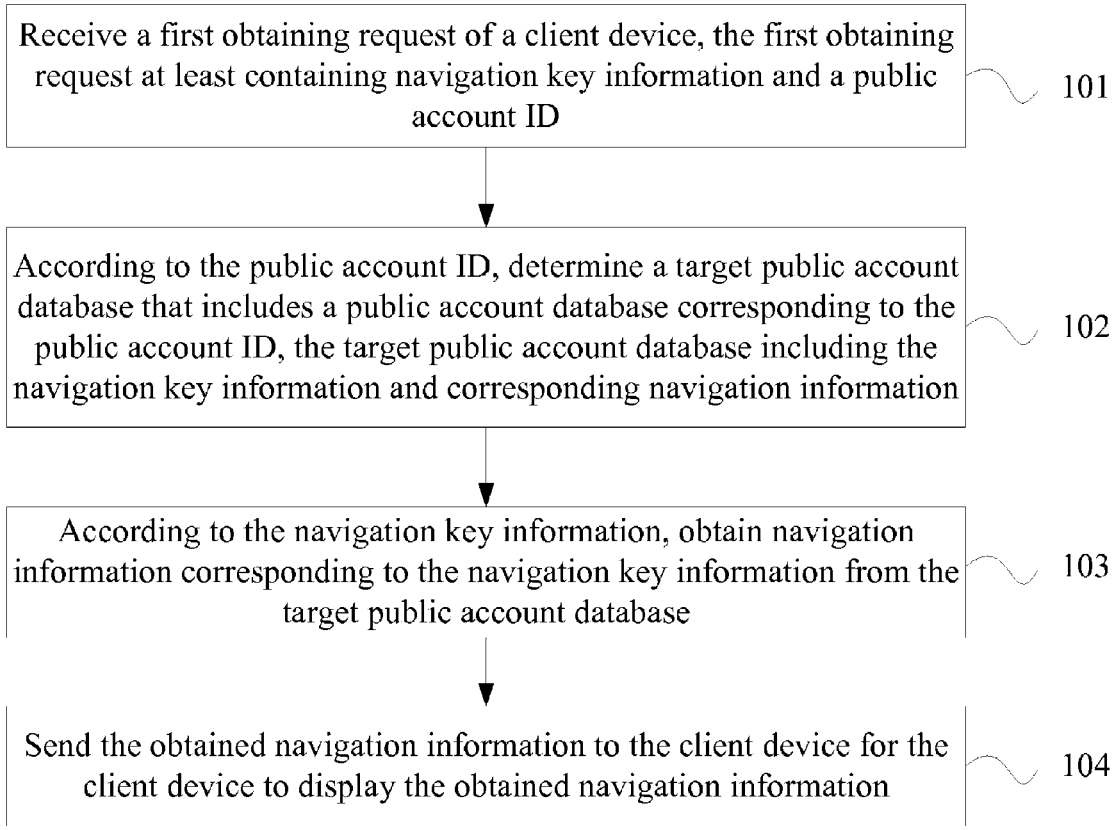
FIG. 1 depicts an exemplary method for obtaining navigation information in accordance with various disclosed embodiments.

FIG. 1 depicts an exemplary method for obtaining navigation information in accordance with various embodiments.

For example, in Step 101, a first obtaining request of a client device is received. The first obtaining request at least contains navigation key information and a public account identification (ID).

In Step 102, according to the public account ID, a target public account database is determined. The target public account database includes a public account database corresponding to the public account ID, the target public account database including navigation key information and corresponding navigation information.

In Step 103, according to the navigation key information, navigation information corresponding to the navigation key information is obtained from the target public account database.

In Step 104, the obtained navigation information is sent to the client device for the client device to display the obtained navigation information.

The exemplary method can be implemented by a backend server having instant communication capabilities. The backend server can support voice signals, audios, videos, pictures, text, and any other suitable communication forms, among various client devices and/or among groups of persons with each person having a different client device.

In the disclosed methods, by providing navigation information from a backend (e.g., the backend server) and having the client device communicate with the backend in a mode of one reply to one question. This simplifies the process for obtaining the navigation information. Since the navigation information is obtained based on the client device and the navigation key information that the user has already had, there is no need to rely on additional navigation devices. Operation and maintenance costs are reduced.

Figure 2A:
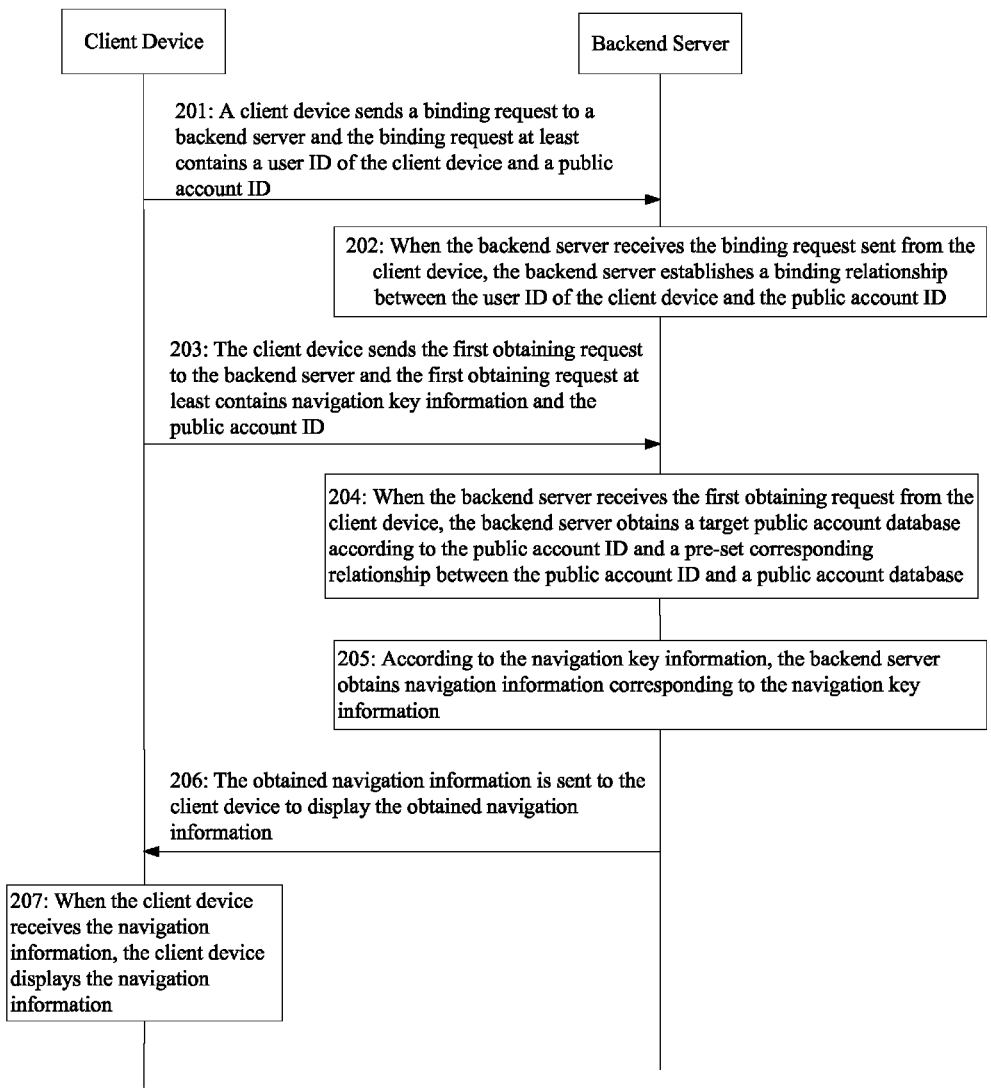
FIG. 2a depicts another exemplary method for obtaining navigation information in accordance with various disclosed embodiments.

FIG. 2a depicts an exemplary method for obtaining navigation information in accordance with various embodiments. In this example, client device and backend server are used as main elements for interaction.

In Step 201, a client device sends a binding request to a backend server. The binding request at least contains a user ID of a client device and a public account ID.

A public account refers to an account that a service provider applies for on the backend server. Such account is authenticated by the backend server. When a user is bound with the public account, the public account can broadcast messages or otherwise provide services to users. At this point, the public account can be used as information medium between the server provider and the user bound with the public account. As such, information flow between different platforms can be achieved. Efficiency of information flow can be improved.

Referring back to Step 201, the client device receives the user's request for adding the public account and sends the binding request to the backend server. The binding request at least contains the user ID of the client device and the public account ID. The binding request can be used to request for binding the user ID and the public account ID contained in the binding request.

The user ID of the client device can be used to uniquely identify user account of the client device. The user ID of the client device can be, for example, a user account, identification information generated according to the user account, identification information corresponding to the user account, etc. The public account ID can be used to uniquely identify the public account. The public account ID can be, for example, a public account, identification information generated according to the public account, identification information corresponding to the public account, etc.

Further, when the client device obtains the request for adding the public account and the public account to be added, the client device can send the binding request to the backend server. In particular, various methods can be used for obtaining the adding request and the public account and sending the binding request to the backend server.

In one example, the user of the client device can input the public account to be added on the client device to trigger a search of the public account. When the public account is found, and once it is determined to add the public account as a friend or determined to follow the public account, the client device can trigger a request for adding the public account, the client device can send the binding request to the backend server.

In an exemplary embodiment, searching the public account can be based on the public account or keywords of the public account. For example, for museums or tourist attractions, names or keywords from the name, such as "museum", "Shanxi Museum" or "Huang Shan", can be inputted on the client device by the user of the client device. The name or keywords from the name can be inputted by a text message or a voice message or a voice control command. For example, if "Shaanxi Museum" or "museum" needs to be searched, the user can key in these words on the client device, or say "Shaanxi Museum" to the client device after the search function is opened, or give a voice control command "Find Shaanxi Museum" to the client device. In this manner, the user of the client device can input the public account on the client device to trigger the search of the public account.

In another example, based on the geographic location information of the client device, the backend server can obtain a public account near the client device and provide the public account to the client device. When the user of the client device triggers to add the public account, the client device can send the binding request to the backend server. The geographic location information can be obtained, according to LBS (i.e., Location Based Service) provided by the client device. For example, when the client device sends the search for nearby accounts to the backend server, the backend server can obtain information based on the geographic location information, e.g., by a look-around function; or by a shake function when the client device receives commands for shaking and initiates a search of the backend server; or by a drift bottle function when the client device initiates a request for the backend server to send messages to any person.

In various embodiments, prior to performing Step 201, the public account administrator may register the public account on a public platform and create public account database to bind the public account with the corresponding public account database. The public account database can include navigation key information and corresponding navigation information. The navigation key information can be used for indexing navigation information. Each piece of the navigation key information can index multiple navigation information and that each piece of the navigation key information can index multiple types of navigation information. The navigation key information can be in a form including a digital numbering, a text message, a picture or image, an audio, etc. The navigation information can have a format to facilitate the user of the client device to search or play those including, for example, text messages, pictures, videos, audios, and so on. In an example, the navigation key information can be "12", and accordingly, corresponding navigation information can be "Blue and White Porcelain of Tang Dynasty", pictures of Blue and White Porcelain of Tang Dynasty, and text to explain the details regarding the Blue and White Porcelain of Tang Dynasty.

It should be noted that the public account database may be located on a public account server. A public account server can serve multiple public accounts, indexed by the public account ID or the public account. Of course, in some cases to avoid inquiry or search errors, one account server can serve one public account, which reserves room for subsequent data updates and subsequent upgrades.

The public account administrator (e.g., developers and navigation information providers) may adjust (e.g., edit and/or update) the navigation key information and navigation information stored in the public account database depending on specific needs. The adjustment may include, for example, adding, modifying, and/or deleting navigation key information and navigation information; adding, modifying, and/or deleting a mapping method or a matching method between the navigation key information and the navigation information; etc.

Any suitable methods can be used to edit or update the navigation key information and navigation information. Such adjustment from the backend provides a simple process and does not involve an update operation on each client device. This greatly reduces maintenance and operation costs and increases efficiency of maintenance.

In Step 202, when the backend server receives the binding request sent from the client device, the backend server establishes a binding relationship between the user ID of the client device and the public account ID.

The binding relationship can be a friend-relationship between the user ID of the client device and the public account ID, and/or a following-relationship between the user ID of the client device and the public account ID. Therefore, according to the binding request, the backend server can establish a friend-relationship and/or a following-relationship between the user ID of the client device and the public account ID, such that a user having the user ID can communicate with the public account.

In some cases, it should be noted that the time for implementing the above Steps 201 and 202 can only be prior to the Step 203.

In Step 203, the client device sends a first obtaining request to the backend server and the first obtaining request at least contains navigation key information and the public account ID. The client device can receive the navigation key information inputted by the user, which can be displayed on the client device as a message sent by the user to the public account.

For those museums or tourist attractions that provide navigation information, the navigation key information can be provided at designated positions or locations, such that the user of the client device can use the client device to obtain the navigation information. The navigation key information can be text, numbers, or two-dimensional (2D) code provided near an exhibit or an attraction to be searched. In an example that the user of the client device visits Shanxi Museum to see the exhibition therein, a signboard can be set next to the exhibition of "Blue and White Porcelain of Tang Dynasty" to provide navigation key information. The navigation key information on the signboard can be a number "12" or "Blue and White Porcelain of Tang Dynasty" or "Blue and White Porcelain" or a 2D code used to instruct the Blue and White Porcelain of Tang Dynasty.

Further, the first obtaining request can also contain a navigation information type, navigation area information, navigation classifying information, etc. In a subsequent searching process by the backend server, the navigation information type, the navigation area information, and the navigation classifying information can be used as searching conditions to further define or limit the obtained navigation information and to provide a more-precise searching. This provides a more convenient manner for obtaining the navigation information.

The navigation information type can refer to what types of the navigation information can be obtained. The navigation information type can be set to be, e.g., an image, text, audio, and/or video. The navigation area information can be a sub-area used to indicate the public account. In the example of Shaanxi Museum, the sub-area can include a first exhibition area, a second exhibition area, etc. In addition, if the navigation information provider has a new exhibition or a new area, etc., such new exhibition or the new area can be updated to the navigation area information for the client device to trigger to obtain the navigation information in the navigation area information. The navigation classifying information can be used to classify the navigation information in multi-dimensions according to feature of each piece of the navigation information in the public account database. For example, the navigation classifying information can be classified according to porcelain, bronzes and other utensils texture, while the navigation information under the classified categories may belong to different navigation areas. This provides the navigation information with a multi-dimensional searching manner, which improves flexibility of the navigation information.

In Step 204, when the backend server receives the first obtaining request from the client device, the backend server obtains a target public account database, according to the public account ID and a pre-set corresponding relationship between the public account ID and a public account database. The target public account database can be the public account database corresponding to the public account ID. The target public account database can include navigation key information and the corresponding navigation information.

The corresponding relationship between the public account ID and the public account database can be saved on the backend server. Based on the corresponding relationship, a URL or website for the public account database can be obtained, i.e., the target public account database can be obtained.

Further, when the navigation key information has a format of a second specified format, the format of the navigation key information can be converted into a first specified format. The first specified format can be a format that the target public account database supports, and the second specified format can be a format that the target public account database does not support.

The client device can provide various inputting manners, such as a voice input or image input, etc., for the user to input navigation key information. For example, the client device can collect what the user called "Blue and White Porcelain of Tang Dynasty". In a case that voice signal may not be a format that the target public account database supports, the voice signal can be converted to a text message that the target public account database supports. Alternatively, text information can be extracted from images to provide a format that the target public account database supports.

In Step 205, based on the navigation key information, the backend server obtains navigation information corresponding to the navigation key information.

In an example with a simple database format, the target public account database can save the navigation key information and corresponding navigation information in a format of Key-Value. Therefore, by searching the navigation key information as a Key-Value, it can be known if the target public account database has saved the navigation information corresponding to the navigation key information. When the navigation information has been saved, the navigation information corresponding to the navigation key information in the target public account database can be obtained.

Further, since the first obtaining request may further contain navigation area information, the obtaining of the navigation information corresponding to the navigation key information from the target public account database according to the navigation key information can include: determining the navigation information corresponding to the navigation area information from the target public account database according to the navigation area information and obtaining the navigation information corresponding to the navigation area information from the target public account database according to the navigation area information.

Further, since the first obtaining request may further contain a navigation information type, the obtaining of the navigation information corresponding to the navigation key information from the target public account database according to the navigation key information can include: obtaining the navigation information matching the navigation information type and corresponding to the navigation key information from the target public account database according to the navigation key information.

The client device may provide the navigation information type and navigation area information and other suitable options for the user of the client device to trigger. When the user of the client device triggers the navigation information type and navigation area information and inputs the navigation key information, the client device can send the first obtaining request to the backend server. The first obtaining request can contain navigation key information and public account ID, and also contain the triggered the navigation information type and/or the navigation area information, such that the backend server can obtain the navigation information according to the information contained in the first obtaining request.

In addition, when the public account has a push message, the message can be pushed to the user of the client device due to a binding relationship between the user of the client device and the public account.

Figure 2B:
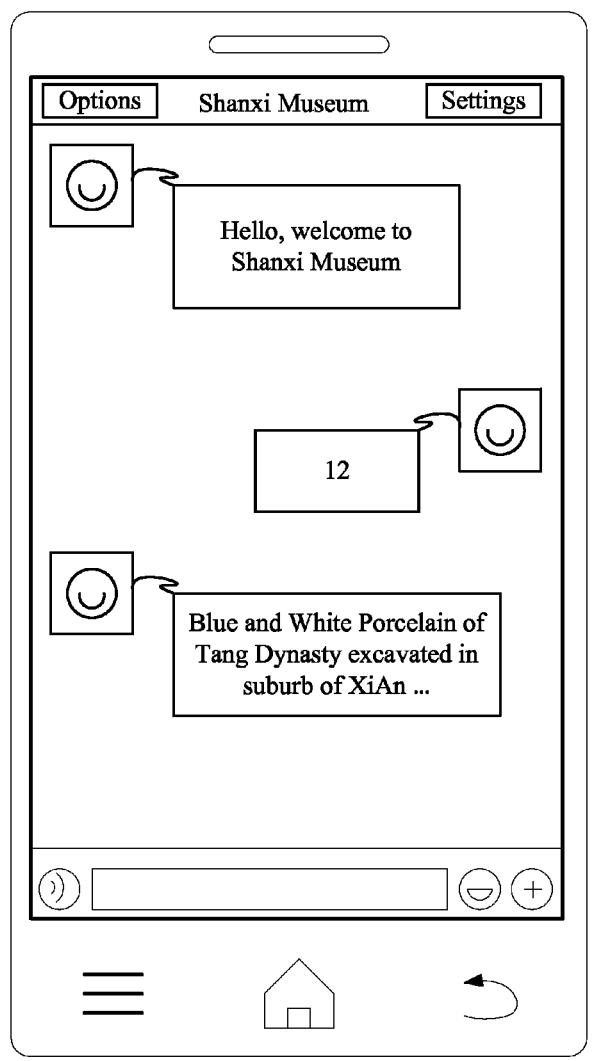
FIG. 2b depicts an exemplary display interface of a client device in accordance with various disclosed embodiments.

FIG. 2b depicts an exemplary display interface of a client device. The exemplary display interface provides an interface for obtaining navigation information. As shown in FIG. 2b, such interface takes a form of one reply to one question in a process to obtain navigation information. This is simple and convenient for users to operate.

Figure 2C:
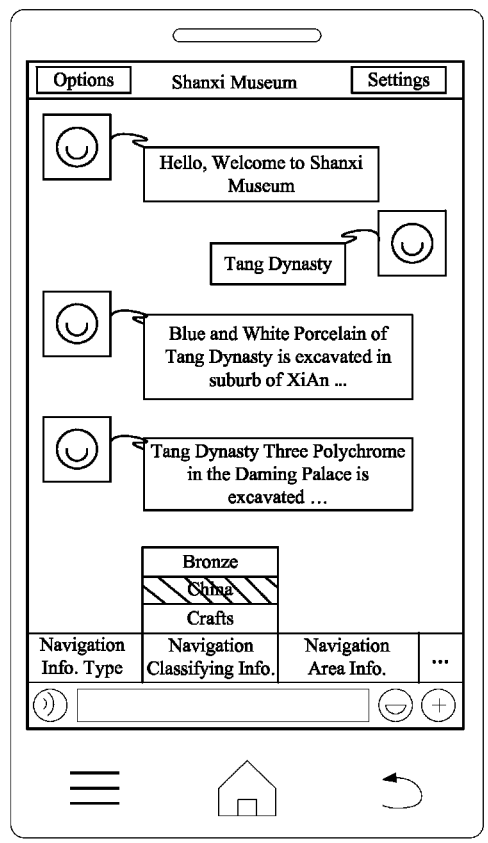
FIG. 2c depicts another exemplary display interface of a client device in accordance with various disclosed embodiments.

FIG. 2C depicts another exemplary display interface of a client device. On the exemplary display interface, there is provided an option for navigation classifying information, an option for a navigation information type, and an option for navigation area information. When the option of the navigation classifying information is triggered, each piece of navigation classifying information in the public account database of the public account can be displayed. When any piece of navigation classifying information is triggered and the user inputs navigation key information, the first obtaining request can be sent to the backend server. Similar process can be implemented when the option of the navigation information type and/or the option of the navigation area information are triggered. Details of the similar process are therefore not described herein.

Further, FIG. 2c shows an obtaining of the navigation information according to navigation classifying information "Porcelain" and a user's input of "Tang Dynasty". As shown, at least one piece of navigation information is returned from the backend server. The at least one piece of navigation information can be the navigation information corresponding to "Porcelain" and "Tang Dynasty". Moreover, although FIG. 2C is shown to offer two options, one of ordinary skill in the art would appreciate that more options can be displayed on the exemplary display interface according to various settings of the public account database to allow the user of the client device to be more conveniently and precisely obtain the navigation information.

In Step 206, the obtained navigation information is sent to the client device for the client device to display the obtained navigation information. The obtained navigation information can be one or more of, for example, an audio, video, text, and/or image.

In Step 207, when the client device receives the navigation information, the client device displays the navigation information.

When the client device receives the navigation information, the client device may display the navigation information on a current dialogue interface in a form as a reply to a message sent from the user of the client device for the user to view. Of course, depending on the type of navigation information, the user may view by, e.g., playing an audio and/or video, and/or reading.

As disclosed herein, by the backend providing the navigation information and by the client device communicating with the backend in an obtaining mode of one reply to one question, the obtaining of the navigation information is simplified. Because the obtaining of the navigation information is based on the client device that the user has already had and the navigation key information, there is no need to rely on additional navigation device. This reduces operation and maintenance costs. In addition, because the obtaining of the navigation information can be further defined or limited by other obtaining conditions determined by the client device, the obtaining efficiency can be improved. Further, because the instant communication is widely used, their users can have high level of familiarity with the instant communication tools and the instant communication operations. This allows the obtaining of the navigation information to be more universal with low learning cost and using an intuitive and simple process.

Figure 2D:
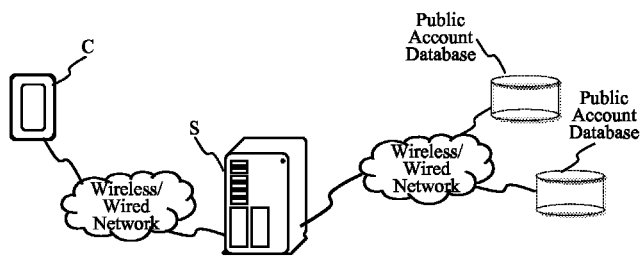
FIG. 2d depicts an exemplary environment accommodating the disclosed embodiments in accordance with various disclosed embodiments.

FIG. 2d provides an exemplary environment accommodating the disclosed embodiments. As shown in FIG. 2d, such environment can include a client device C, a server S, and/or at least one public account database.

The client device C may be connected with the server S via a wireless or wired network. The client device C may be a computer, a smart phone, a tablet computer, and/or other suitable electrical devices. The server S can be a server used to handle information exchange with the client device C. The server S can also be a server cluster. The public account database can be a database used to save navigation key information and corresponding navigation information. In an exemplary embodiment, a user account can be an account that a user used to login the client device C.

Figure 3A:
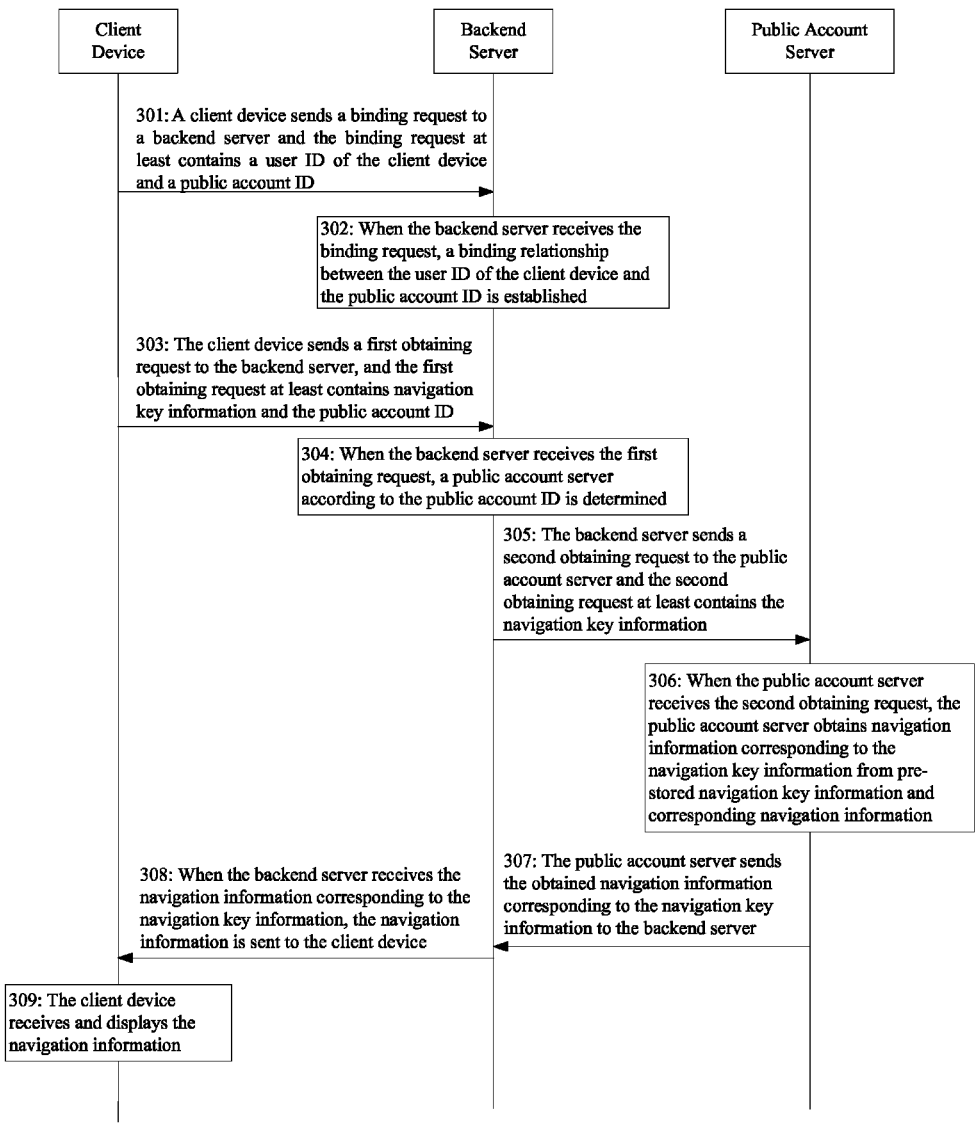
FIG. 3a depicts another exemplary method for obtaining navigation information in accordance with various disclosed embodiments.

FIG. 3a depicts another exemplary method for obtaining navigation information in accordance with various embodiments. In this example, a client device, a backend server, and a public account server can be used as main elements for interaction.

In Step 301, a client device sends a binding request to a backend server and the binding request at least contains a user ID of the client device and a public account ID.

In Step 302, when the backend server receives the binding request of the client device, the backend server establishes a binding relationship between the user ID of the client device and the public account ID.

In Step 303, the client device sends a first obtaining request to the backend server, and the first obtaining request at least contains navigation key information and the public account ID. In various embodiments, the Steps 301 to 303 can be performed similarly or the same as performing Steps 201 to 203.

In Step 304, when the backend server receives the first obtaining request of the client device, the backend server determines a public account server according to the public account ID.

The first obtaining request may also contain navigation area information and/or a navigation information type. Of course, the first obtaining request can also contain other information for further defining or limiting the navigation information including, for example, navigation classifying information.

In the disclosed example that an instant communication system includes the client device, the backend server, and the public account server, the public account server can be used as a part of a server cluster, or a separate server, to store the public account database corresponding to the public account ID. The target public account database can include the navigation information corresponding to the navigation key information.

Specifically, a corresponding relationship between the public account ID and the public account server can be saved on the backend server. Based on the corresponding relationship, a URL or website of the public account database can be obtained, i.e., the target public account database can be obtained.

In Step 305, based on the navigation key information, the backend server sends a second obtaining request to a public account server. The second obtaining request at least contains the navigation key information such that a server of the target public account database can return the navigation information corresponding to the navigation key information.

The second obtaining request can contain navigation area information and/or a navigation information type. Of course, the second obtaining request can also contain other information for further defining or limiting the navigation information including, for example, navigation classifying information.

At this point, the backend server can be used only for an unvarnished transmission between the client device and the public account server, for example, to forward the obtaining request of the public account to the public account server, and/or to forward the navigation information returned from the public account server to the client device. This reduces the amount of data handled by the backend server and increases speed for obtaining the request for processing and for obtaining the response.

In Step 306, when the public account server receives the second obtaining request sent from the backend server, according to the navigation key information, the public account server obtains navigation information corresponding to the navigation key information from pre-stored navigation key information and the corresponding navigation information.

Further, the second obtaining request can also contain navigation area information, and that according to the navigation key information, the public account server obtains navigation information corresponding to the navigation key information from the pre-stored navigation key information and the corresponding navigation information can include: according to the navigation area information, determining the navigation information corresponding to the navigation area information from the pre-stored navigation key information and the corresponding navigation information; and according to the navigation key information, obtaining the navigation information corresponding to the navigation key information from the navigation information corresponding to the navigation area information.

Further, the second obtaining request can also contain a navigation information type, and that according to the navigation key information, the public account server obtains navigation information corresponding to the navigation key information from the pre-stored navigation key information and the corresponding navigation information can include: according to the navigation key information, obtaining the navigation information corresponding to the navigation key information and matching the navigation information type from the pre-stored navigation key information and the corresponding navigation information.

It should be noted that the obtaining process according to information contained in the obtaining request(s) can be the same or similar to the process as depicted in FIG. 2a.

Further, when the navigation key information has a format of a second specified format, the second specified format of the navigation key information can be converted into a first specified format. The first specified format can be a format that the public account server supports, and the second specified format can be a format that the public account server does not support. The client device can provide various inputting manners such as a voice input or image input, etc. for the user to input navigation key information. Because the format of the voice signal may not be supported by the public account server, the voice signal needs to be converted to a text message. In some cases, text may be extracted from image information in a format that other public account server supports.

In Step 307, the public account server sends the obtained navigation information corresponding to the navigation key information to the backend server. The obtained navigation information can be one or more of an audio, video, text, and/or image.

In Step 308, when the backend server receives the navigation information corresponding to the navigation key information, the backend server can send the navigation information corresponding to the navigation key information to the client device.

In Step 309, when the client device receives the navigation information corresponding to the navigation key information, the navigation information corresponding to the navigation key information can be displayed on the client device.

When the client device receives the navigation information, the client device may display the navigation information on a current dialogue interface in a form as a reply to a message sent from the user of the client device for the user to view. Of course, depending on the type of navigation information, the user may view by playing an audio and/or video, and/or by reading.

As disclosed herein, by the public account server providing the navigation information and by communicating among the client device, the backend server and the public account server, in an obtaining mode of one reply to one question, the obtaining of the navigation information is simplified. Because the obtaining of the navigation information is based on the client device that the user has already had and the navigation key information, there is no need to rely on additional navigation device. This reduces operation and maintenance costs. In addition, because the obtaining of the navigation information can be further defined or limited by other obtaining conditions determined by the client device, the obtaining efficiency can be improved. Further, because instant communication is widely used, their users can have high level of familiarity with instant communication tools and instant communication operations. This allows the obtaining of the navigation information to be more universal with low learning cost and using an intuitive and simple process.

Figure 3B:
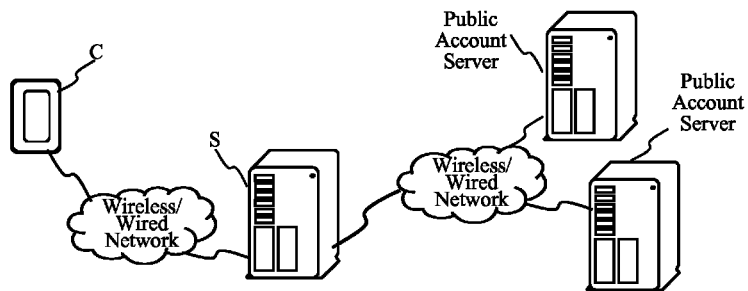
FIG. 3b depicts an exemplary environment accommodating the disclosed embodiments.

FIG. 3b provides an exemplary environment accommodating the disclosed embodiments. As shown in FIG. 3b, such environment can include a client device C, a server S, and/or at least one public account server.

The client device C may be connected with the server S via a wireless or wired network. The client device C may be a computer, a smart phone, a tablet computer, and/or other suitable electrical devices. The server S can be a server used to handle information exchange with the client device C. The server S can also be a server cluster. The public account server can be a server used to save navigation key information and corresponding navigation information. Each public account server can be used to serve a corresponding public account. In an exemplary embodiment, a user account can be an account for a user to login the client device C.

Figure 4:
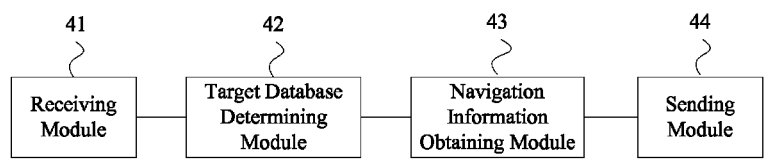
FIG. 4 depicts an exemplary backend server in accordance with various disclosed embodiments.

FIG. 4 is an exemplary backend server. The exemplary backend server can include a receiving module 41, a target database determining module 42, a navigation information obtaining module 43, and/or a sending module 44.

The receiving module 41 can be configured to receive a first obtaining request of a client device. The first obtaining request at least contains navigation key information and a public account ID.

The target database determining module 42 can be configured to determine a target public account database according to the public account ID. The target public account database can be a public account database corresponding to the public account ID. The target public account database can include navigation key information and corresponding navigation information.

The navigation information obtaining module 43 can be configured to obtain navigation information corresponding to the navigation key information from the target public account database according to the navigation key information.

The sending module 44 can be configured to send the obtained navigation information to the client device, such that the client device can display the obtained navigation information.

Optionally, the first obtaining request further contains navigation area information. In this case, the navigation information obtaining module 43 can be configured to determine navigation information corresponding to the navigation area information in the target public account database according to the navigation area information. The navigation information obtaining module 43 can be configured to obtain navigation information corresponding to the navigation key information from navigation information corresponding to the navigation area information.

Optionally, the first obtaining request further contains a navigation information type. The navigation information obtaining module 43 can be configured to obtain navigation information corresponding to the navigation key information and matching the navigation information type from the target public account database according to the navigation key information.

Optionally, the exemplary backend server can further include a format converting module. The format converting module can be configured, when the navigation key information has a format of a second specified format, to convert the second specified format of the navigation key information to a first specified format. The first specified format is supported by target public account database, while the second specified format is not supported by the target public account database.

Optionally, the target database determining module can be configured to obtain the target public account database from a pre-set corresponding relationship between the public account ID and the public account database according to the public account ID.

Optionally, the exemplary backend server can further include a binding request receiving module, and/or a binding relationship establishing module. The binding request receiving module can be configured to receive a binding request of the client device. The binding request at least contains the user ID of the client device and the public account ID. The binding relationship establishing module can be configured to establish a binding relationship between the user ID of the client device and the public account ID.

Optionally, the navigation information obtaining module can be configured to send a second obtaining request to the target public account database according to the navigation key information. The second obtaining request at least contains the navigation key information, such that a server of the target public account database can return navigation information corresponding to the navigation key information. The navigation information corresponding to the navigation key information can then be received.

Figure 5:
FIG. 5 depicts another exemplary backend server in accordance with various disclosed embodiments.

FIG. 5 is another exemplary backend server. The exemplary backend server can include a receiving module 51, a target service determining module 52, and/or a sending module 53.

The receiving module 51 can be configured to receive a first obtaining request of a client device. The first obtaining request at least contains navigation key information and public account ID.

The target server determining module 52 can be configured to determine a server of the target public account database according to the public account ID. The target public account database can be public account database corresponding to the public account ID. The target public account database can include navigation key information and corresponding navigation information.

The sending module 53 can be configured to send a second obtaining request to the server of the target public account database according to the navigation key information. The obtaining request at least contains navigation key information, so that the server of the target public account database can return navigation information corresponding to the navigation key information.

The receiving module 51 can also be configured to receive navigation information corresponding to the navigation key information, and to send the navigation information corresponding to the navigation key information to the client device.

Optionally, the target server determining module 52 can obtain the server of the target public account database from a pre-set corresponding relationship between the public account ID and the public account database and according to the public account ID.

Optionally, the exemplary server can further include a binding request receiving module and/or a binding relationship establishing module. The binding request receiving module can be configured to receive a binding request from the client device. The binding request at least contains the user ID of the client device and the public account ID. The binding relationship establishing module can be configured to establish a binding relationship between the user ID of the client device and the public account ID.

Optionally, the second obtaining request also includes navigation area information and/or a navigation information type.

Figure 6:
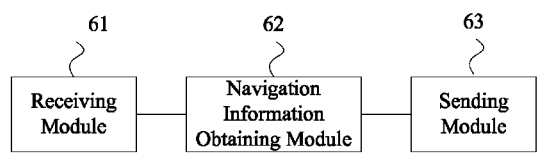
FIG. 6 depicts an exemplary public account server in accordance with various disclosed embodiments.

FIG. 6 depicts an exemplary public account server. The exemplary public account server can include a receiving module 61, a navigation information obtaining module 62, and/or a sending module 63.

The receiving module 61 can be configured to receive a second obtaining request sent from a backend server, and the obtaining request at least contains navigation key information.

The navigation information obtaining module 62 can be configured to obtain navigation information corresponding to the navigation key information from the pre-stored navigation key information and the corresponding navigation information according to navigation key information.

The sending module 63 can be configured to send the obtained navigation information corresponding to the navigation key information to the backend server.

Optionally, the public account server can further include a format converting module. The format converting module can be configured, when the navigation key information has a second specified format, to convert the second specified format to a first specified format. Optionally, the second obtaining request also contains navigation area information.

The navigation information obtaining module 62 can be configured, according to the navigation area information, to determine navigation information corresponding to the navigation area information from the pre-stored navigation key information and the corresponding navigation information; and according to the navigation key information, to obtain navigation information corresponding to the navigation key information from navigation information corresponding to the navigation area information.

Optionally, the second obtaining request can also contain a navigation information type. In this case, the navigation information obtaining module 62 can be configured, according to the navigation key information, to obtain navigation information corresponding to the navigation key information and matching the navigation information type from the pre-stored navigation key information and the corresponding navigation information.

Figure 7:
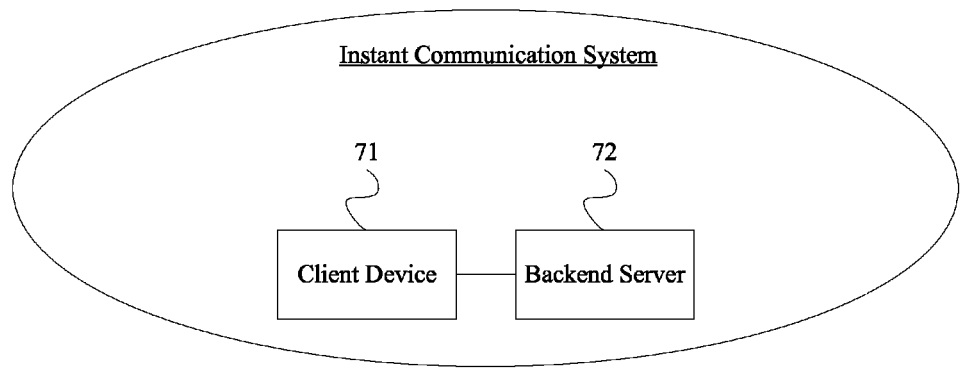
FIG. 7 depicts an exemplary instant communication system in accordance with various disclosed embodiments.

FIG. 7 depicts an exemplary instant communication system. The exemplary instant communication system can include a client device 71 and/or a backend server 72.

The client device 71 can be configured to send a first obtaining request to the backend server. The first obtaining request at least contains navigation key information and public account ID.

The backend server 72 can be configured to receive the first obtaining request of the client device. The first obtaining request at least contains navigation key information and a public account ID. Based on the public account ID, a target public account database can be determined. The target public account database can be a public account database corresponding to the public account ID. The target public account database can include navigation key information and corresponding navigation information. According to the navigation key information, navigation information corresponding to the navigation key information can be obtained from the target public account database. The obtained navigation information can be sent to the client device for the client device to display the obtained navigation information.

Figure 8:
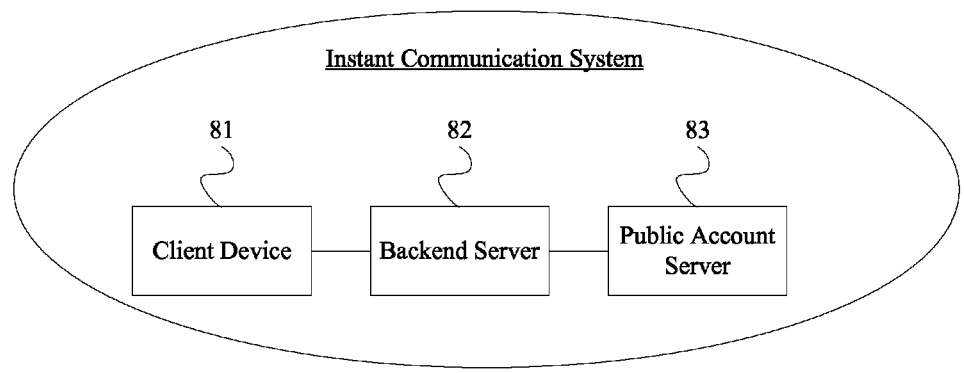
FIG. 8 depicts another exemplary instant communication system in accordance with various disclosed embodiments.

FIG. 8 depicts another exemplary instant communication system. The exemplary instant communication system can include a client device 81, a backend server 82, and a public account server 83.

The client device 81 can be configured to send a first obtaining request to a backend server. The first obtaining request at least contains navigation key information and public account ID.

The backend server 82 can be configured to receive the first obtaining request of the client device. The first obtaining request at least contains navigation key information and public account ID. According to the public account ID, a server of the target public account database can be determined. The target public account database can be a public account database corresponding to the public account ID. The target public account database can include navigation key information and corresponding navigation information.

According to the navigation key information, a second obtaining request can be sent to a server of the target public account database. The obtaining request at least contains navigation key information, so that the server of the target public account database can return navigation information corresponding to the navigation key information. Navigation information corresponding to the navigation key information can be received. Navigation information corresponding to the navigation key information can be sent to the client device.

The public account server 83 can be configured to receive a second obtaining request sent by the backend server. The obtaining request at least contains navigation key information. According to the navigation key information, navigation information corresponding to the navigation key information can be obtained from the pre-stored navigation key information and the corresponding navigation information. The obtained navigation information corresponding to the navigation key information can be sent to the backend server.

The disclosed methods, servers, and systems for obtaining navigation information can include various functional modules (or devices or units), e.g., as shown in FIG. 2d, 3b, and FIGS. 4-8, which can be configured in any suitable manners to partially or wholly perform desired function(s). For example, the modules can be configured in one device or in multiple devices as desired. The modules disclosed herein can be integrated in one module or in multiple modules. Each of the modules disclosed herein can be divided into one or more sub-modules, which can be recombined in any manners.

The disclosed embodiments can be examples only. One of ordinary skill in the art would appreciate that suitable software and/or hardware (e.g., a universal hardware platform) may be included and used to perform the disclosed methods. For example, the disclosed embodiments can be implemented by hardware only, which alternatively can be implemented by software products only. The software products can be stored in a storage medium. The software products can include suitable commands to enable any client device (e.g., including a mobile phone, a personal computer, a server, or a network device, etc.) to implement the disclosed embodiments.

Other applications, advantages, alternations, modifications, or equivalents to the disclosed embodiments are obvious to those skilled in the art and are intended to be encompassed within the scope of the present disclosure.

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Various embodiments provide methods, servers, and systems for obtaining navigation information. In an exemplary method, a first obtaining request of a client device can be received and the first obtaining request can at least contain navigation key information and a public account ID. According to the public account ID, a target public account database can be determined. The target public account database can be a public account database corresponding to the public account ID. The target public account database can include the navigation key information and corresponding navigation information. According to the navigation key information, navigation information corresponding to the navigation key information from the target public account database can be obtained. The obtained navigation information can then be sent to the client device to display the obtained navigation information.

An exemplary backend server used for obtaining navigation information can include a receiving module, a target database determining module, a navigation information obtaining module, and a sending module. Another exemplary backend server used for obtaining navigation information can include a receiving module, a target server determining module, and a sending module. An exemplary public account server used for obtaining navigation information can include a receiving module, a navigation information obtaining module, and a sending module. An exemplary instant communication system can include a client device and/or a backend server. Another exemplary instant communication system can include a client device, a backend server, and a public account server.

As disclosed herein, by the backend providing the navigation information and by the client device communicating with the backend in an obtaining mode of one reply to one question, the obtaining of the navigation information can be simplified. Because the obtaining of the navigation information is based on the client device that the user has already had and the navigation key information, there is no need to rely on additional navigation device. This reduces operation and maintenance costs. In addition, because the obtaining of the navigation information can be further defined or limited by other obtaining conditions determined by the client device, the obtaining efficiency can be improved. Further, because the instant communication is widely used, their users can have high level of familiarity with instant communication tools and instant communication operations. This allows the obtaining of the navigation information to be more universal with low learning cost and using an intuitive and simple process.

What is claimed is:

1. A method for obtaining navigation information, comprising:
   receiving, by a backend server, a public account ID registration, wherein the backend server supports instant communications among a plurality of client devices;
   corresponding, by the backend server, a public account database with the public account ID;
   receiving, by the backend server, a first obtaining request of a client device, the first obtaining request at least containing navigation key information and the public account ID;
   according to the public account ID, determining, by the backend server, a target public account database, wherein the target public account database is the public account database corresponding to the public account ID, the target public account database comprising the navigation key information and corresponding navigation information;
   according to the navigation key information, obtaining, by the backend server, navigation information corresponding to the navigation key information from the target public account database; and sending, by the backend server, the obtained navigation information to the client device to display the obtained navigation information as an incoming communication message.

2. The method of claim 1, wherein the first obtaining request further contains navigation area information and wherein according to the navigation key information, obtaining the navigation information corresponding to the navigation key information from the target public account database comprises:
- according to the navigation area information, determining navigation information corresponding to the navigation area information from the target public account database; and
- according to the navigation key information, obtaining the navigation information corresponding to the navigation key information from the navigation information corresponding to the navigation area information.

3. The method of claim 1, wherein the first obtaining request further contains a navigation information type, and wherein according to the navigation key information, obtaining the navigation information corresponding to the navigation key information from the target public account database comprises:
- according to the navigation key information, obtaining the navigation information matching the navigation information type and corresponding to the navigation key information from the target public account database.

4. The method of claim 1, wherein, prior to obtaining the navigation information corresponding to the navigation key information from the target public account database, the method further comprises:
- when the navigation key information has a second specified format, converting the second specified format into a first specified format, wherein the first specified format is supported by the target public account database, and the second specified format is not supported by the target public account database.

5. The method of claim 3, wherein, according to the public account ID, determining the target public account database comprises:
- according to the public account ID, obtaining the target public account database from a pre-set corresponding relationship between the public account ID and public account database.

6. The method of claim 1, wherein, prior to receiving the first obtaining request of the client device, the method further comprises:
- searching, by the client device, the public account ID;
- receiving, by the client device, a confirmation to add the public account ID as a friend or follow the public account ID;
- receiving, by the backend server, a binding request of the client device, wherein the binding request at least contains a user ID of the client device and the public account ID; and
- establishing a binding relationship between the user ID of the client device and the public account ID.

7. The method of claim 3, wherein, according to the navigation key information, obtaining the navigation information corresponding to the navigation key information from the target public account database comprises:
- according to the navigation key information, sending a second obtaining request to a server of the target public account database, wherein the second obtaining request at least contains the navigation key information, such that the server of the target public account database returns the navigation information corresponding to the navigation key information; and
- receiving the navigation information corresponding to the navigation key information.

8. A backend server comprising one or more processors, memory, and one or more program modules stored in the memory and to be executed by the one or more processors, the one or more program modules comprising:
- a receiving module, configured to receive a first obtaining request of a client device, the first obtaining request at least containing navigation key information and a public account wherein the public account ID is registered on the backend server;
- a target database determining module, configured, according to the public account ID, to determine a target public account database that comprises a public account database corresponding to the public account ID, the target public account database comprising the navigation key information and corresponding navigation information;
- a navigation information obtaining module, configured, according to the navigation key information, to obtain navigation information corresponding to the navigation key information from the target public account database; and
- a sending module, configured to send the obtained navigation information to the client device to display the obtained navigation information;

wherein:
- the backend server is further configured to support instant communications among a plurality of client devices; and
- the client device displays the obtained navigation information as an incoming communication message.

9. The server of claim 8, wherein the first obtaining request further contains a navigation information type and the navigation information obtaining module is configured:
- according to the navigation key information, to obtain the navigation information corresponding to the navigation key information and matching the navigation information type from the target public account database.

10. The server of claim 9, wherein the target database determining module is configured, according to the public account ID, to obtain the target public account database from a pre-set corresponding relationship between the public account ID and the public account database.

11. The server of claim 10, wherein the navigation information obtaining module is configured:
- according to the navigation key information, to send a second obtaining request to a server of the target public account database, wherein the second obtaining request at least contains the navigation key information, such that the server of the target public account database returns the navigation information corresponding to the navigation key information; and
- to receive the navigation information corresponding to the navigation key information.

12. The method of claim 4, wherein:
the first specified format is a text message, and the second specified format includes a voice input and an image input.

13. The method of claim 6, wherein:
the public account ID is searched based on a user input from the client device.

14. The method of claim 13, wherein:
the user input includes at least one of a text message, a voice message, and a voice control command.

15. The method of claim 6, wherein:
the public account ID is searched based on a geographic location information of the client device.

16. The method of claim 15, wherein:
the geographic location information is obtained according to a location based service provided by the client service, the location based service including at least one of a look-around function to search a nearby account, a shake function to match another account, and a drift bottle function to send messages to another account.

17. The method of claim 6, further comprising:
after the binding relationship is established, receiving, by the client device, a push message from the public account ID.

18. The method of claim 1, wherein:
the target public account database is hosted on a public account server; and
the backend server is used only for an unvarnished transmission between the client device and the public account server, including forwarding the obtaining request of the public account to the public account server, and forwarding the navigation information returned from the public account server to the client device.

19. The method of claim 1, wherein:
when the client device sends the first obtaining request, the client device displays the navigation key information on a dialogue interface as an outgoing communication message.

20. The method of claim 1, wherein:
a display interface of the client device takes a form of one reply to one question in a process to obtain the navigation information.

\* \* \* \* \*